United States Patent
Roach

(10) Patent No.: US 8,717,158 B2
(45) Date of Patent: May 6, 2014

(54) BRAKING INTENSITY DISPLAY

(75) Inventor: Keegan W. Roach, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 129 days.

(21) Appl. No.: 13/493,465

(22) Filed: Jun. 11, 2012

(65) Prior Publication Data
US 2013/0328675 A1 Dec. 12, 2013

(51) Int. Cl.
*B60Q 1/00* (2006.01)

(52) U.S. Cl.
USPC ........ 340/453; 340/425.5; 340/438; 340/441; 73/121; 701/70; 188/62

(58) Field of Classification Search
USPC ........... 340/453, 425.5, 438, 439, 450.1, 441; 73/121; 701/70; 188/62
See application file for complete search history.

(56) References Cited

U.S. PATENT DOCUMENTS

| | | | |
|---|---|---|---|
| 4,520,663 A | | 6/1985 | Moore et al. |
| 4,649,370 A | * | 3/1987 | Thomason .................... 340/453 |
| 5,433,296 A | * | 7/1995 | Webberley .................... 340/454 |
| 5,705,744 A | * | 1/1998 | Brugger et al. ................. 73/121 |
| 6,112,859 A | * | 9/2000 | Shuck et al. ................... 340/454 |
| 6,119,059 A | * | 9/2000 | Tai et al. ........................ 340/453 |
| 6,934,618 B2 | * | 8/2005 | Eckert et al. .................... 701/70 |
| 7,009,508 B2 | * | 3/2006 | Vertenten ...................... 340/453 |
| 2003/0110849 A1 | | 6/2003 | Lonzinski |
| 2011/0082632 A1 | * | 4/2011 | Rowker et al. ................ 340/453 |

* cited by examiner

*Primary Examiner* — Eric M Blount
(74) *Attorney, Agent, or Firm* — M. Daniel Spillman

(57) ABSTRACT

A display for a machine having a hydraulic brake is provided. The display includes a first display and a second display. The first display indicates a rate of heat accumulation within the hydraulic brake. The second display indicates a current temperature of the hydraulic brake.

20 Claims, 7 Drawing Sheets

BRAKING INTENSITY DISPLAY

TECHNICAL FIELD

The present disclosure relates to a temperature monitoring system for a brake on a machine, and more particularly to notifying an operator of an overheat condition of the brake.

BACKGROUND

Most construction machines while travelling downhill experience brake overheating while controlling the speed of the machine by resisting gravitational force. As a result of overheating of the brakes, the operator may have to pull over the machine to allow the brakes to cool down before reaching a desired destination. This results in a loss of productivity due to the time allowed for cooling of the overheated brakes.

The speed at which the machine is running downhill and the extent of brake usage and heating are interrelated factors. In order to allow the machine to run relatively fast downhill, heat accumulated within the brakes needs to be dissipated quickly. On the other hand, when operated slowly downhill, heat dissipation of the brakes may be stretched over a period of time. Typically, there exists a direct relationship between the downhill speed of the machine and the amount of heat accumulation within the brakes. However, although the machine's brakes may never overheat when operated too slowly, machine productivity may also be reduced to undesirable levels.

For example, U.S. Published Application Number 2003/0110849 discloses a method for monitoring the temperature of a friction brake to prevent overheating of the brake. The vehicle speed and brake activation time are monitored for braking event conditions known to add heat to the brake or brakes, and the frequency or rate of occurrence of these conditions is monitored. When the frequency of brake event conditions approaches a threshold value known to be approaching an over-temperature condition, the speed of the vehicle is limited in order to limit the amount of kinetic energy which can be absorbed by the brakes, thereby preventing the brakes from overheating.

SUMMARY OF THE DISCLOSURE

In one aspect of the present disclosure, a display for a machine having a hydraulic brake is provided. The display includes a first display and a second display. The first display indicates a rate of heat accumulation within the hydraulic brake. The second display indicates a current temperature of the hydraulic brake.

In another aspect, a method for indicating a rate of heat accumulation within a hydraulic brake of a machine is provided. The method receives a signal indicative of a current temperature of a hydraulic brake of the machine. The method also receives a signal associated with a brake command. The method determines a rate of heat accumulation within the hydraulic brake based, at least in part, on the received signals and a pre-determined allowable maximum temperature. The method displays the current temperature of the hydraulic brake and the determined rate of heat accumulation within the hydraulic brake.

Other features and aspects of this disclosure will be apparent from the following description and the accompanying drawings.

DETAILED DESCRIPTION

Figure 1:
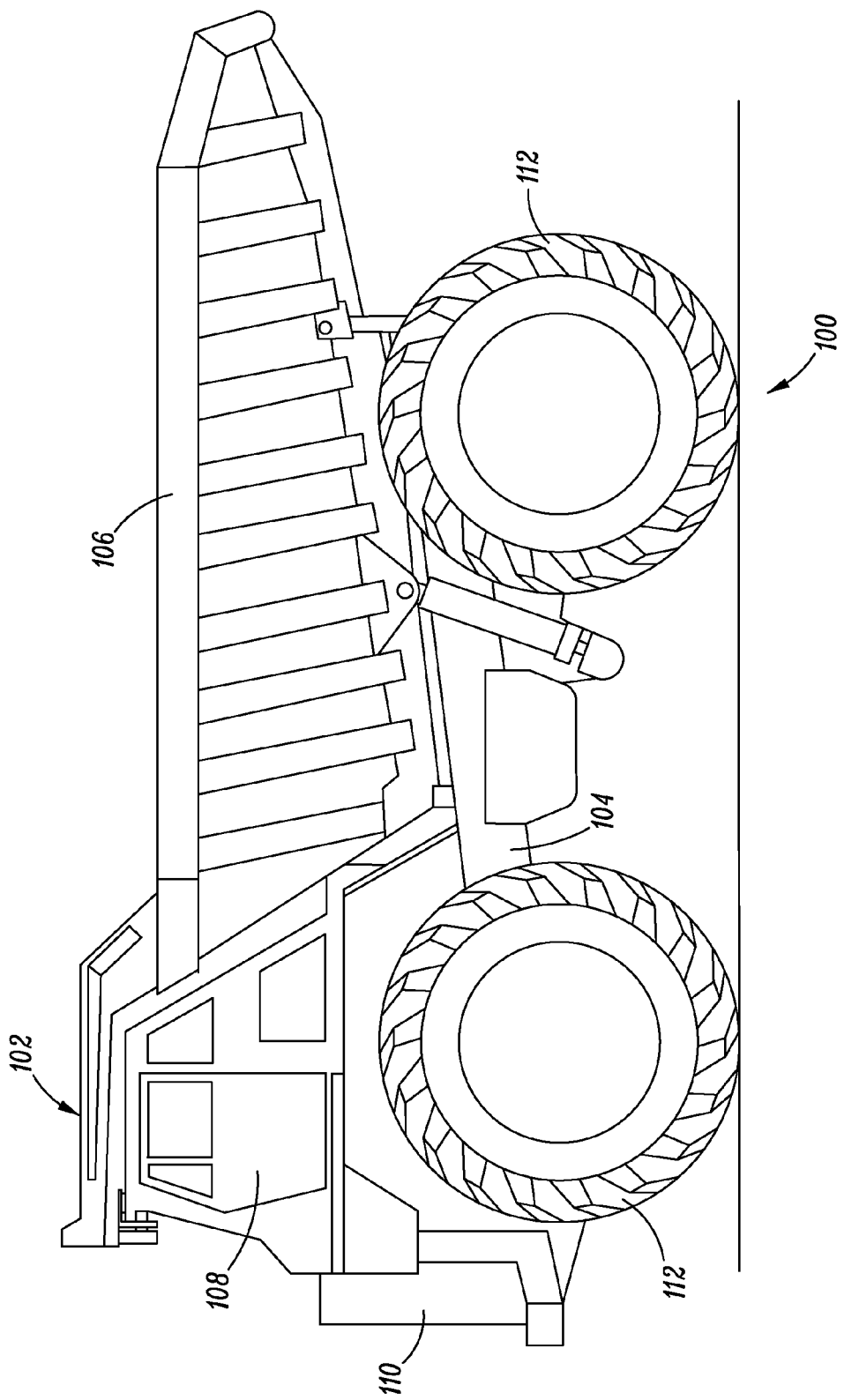
FIG. 1 is a side view of an exemplary machine.

FIG. 1 illustrates an exemplary machine 100, according to one embodiment of the present disclosure. More specifically, as shown in the accompanied figures, the machine 100 may embody a large mining truck 102. It should be understood that the machine 100 may alternatively include an off-highway truck, a quarry truck, an articulated truck, a wheel tractor scraper, or any other suitable construction work machine.

Referring to FIG. 1, the large mining truck 102 may include a frame 104. A material carrying dump body 106 may be pivotably mounted to the frame 104. Further, an operator cab 108 may be mounted to the frame 104, such as, e.g., above an engine enclosure 110 and on a front part of the frame 104. The large mining truck 102 may be supported on the ground by a plurality of wheels 112.

A person of ordinary skill in the art will appreciate that one or more engines (not shown) may be housed within the engine enclosure 110. The engine may provide power to the wheels 112 and a final drive assembly, via a mechanical or electric drive train. In one embodiment, the large mining truck 102 may be configured to carry heavy loads downhill.

Speed of the machine 100 may be controlled by using a hydraulic brake and/or by applying resistive torque to the wheels 112 through the drive train. In one embodiment, the machine 100 may embody a mechanical drive machine. In this situation, there can be a physical connection between the engine, a transmission, a differential, and the wheels 112. Hence, in the mechanical drive machine, retarding can be made possible by creating back-pressure in an exhaust manifold of the engine. This type of mechanical retarding applies resistive torque to the mechanical drive train.

In another embodiment, the machine 100 may also embody an electric drive machine. In this situation, the wheels 112 may be driven by an electric motor, such that the speed of the wheels 112 is controlled by the electric motor to either increase or decrease the wheel speed, as the case maybe. A person of ordinary skill in the art will appreciate that applying negative torque to the wheels 112 for decreasing the speed of the machine 100 may be referred to as dynamic braking or electrical retarding.

A variety of operator controls within the operator cab 108 and systems within the electronics of the machine 100 can be used to interface with the mechanical or electrical retarding system, and the hydraulic brake of the machine 100. For example, one or more brake pedals, a governor/throttle pedal, a cruise control system, a throttle hold system, a backup throttle system, "retarder" levers, automatic retarder control software, and the like, can be used. It should be noted that any or all of these aforementioned controls may be used to input commands into the hydraulic brake and/or the mechanical or electrical retarding system.

Figure 2:
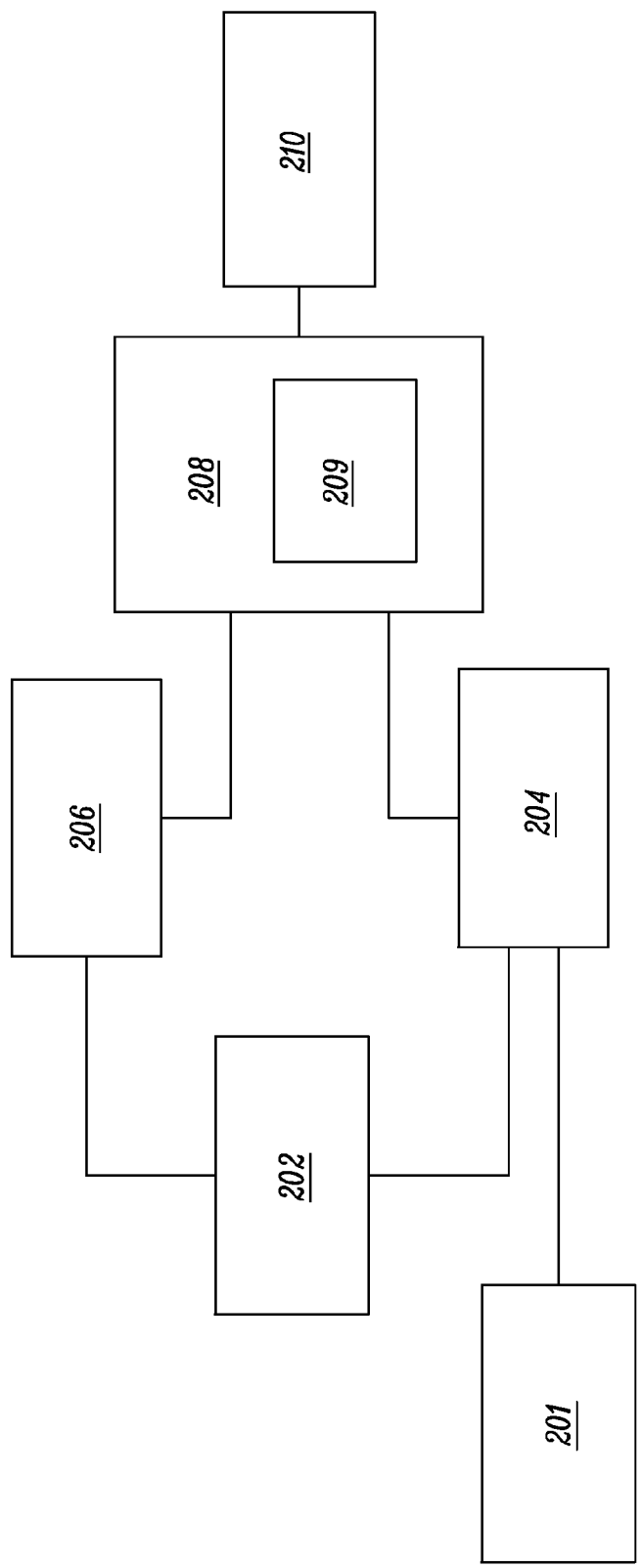
FIG. 2 is a block diagram of an exemplary braking system for the machine of FIG. 1.

Moreover, in case of both mechanical and electric drive machines, the mechanical or the electrical retarding, the hydraulic braking, or any combination thereof, can be controlled or actuated by electronics of the machine 100. The machine 100 may include a retarding system 201 (either mechanical or electrical) and a hydraulic brake 202 as shown in FIG. 2. It should be understood that there may not necessarily be a direct physical linkage, between the operator controls provided within the operator cab 108, such as, the brake pedal(s), and the retarding system 201 or the hydraulic brake 202. For example, the brake pedal may communicate with the machine electronics, and the machine electronics may accordingly activate the retarding system 201, the hydraulic brake 202, or both as appropriate.

Activation and usage of the hydraulic brake 202 can influence the temperature of the fluid used within the hydraulic brake 202. Overheating of the hydraulic brake 202 may result in a significant machine down time and may result in less efficient working operations. To this end, a controller 208 may be provided within the machine 100 and can be configured to determine a rate of heat accumulation within the hydraulic brake 202. In one embodiment, the controller 208 can be coupled to a display 210 to indicate, to an operator, the rate of heat accumulation within the hydraulic brake 202.

As shown in FIG. 2, a braking sensor 204 may be communicably coupled to the brake pedal associated with the hydraulic brake 202. The braking sensor 204 may be configured to generate a signal indicative of a brake command. In one embodiment, the brake command may be indicative of the actuating force exerted by the operator or relative pedal position, thereby defining a degree of engagement of the brake pedal.

When the hydraulic brake 202 is used, kinetic energy is converted into heat. This heat may then be dissipated into the environment. A quantity of the heat may be stored within the hydraulic brake 202, based on physical size and shape of the hydraulic brake 202, quantity of fluid in the hydraulic brake 202, and physical properties of materials used in the hydraulic brake 202. As shown in FIG. 2, a first temperature sensor 206 may also be communicably coupled to the hydraulic brake 202. The first temperature sensor 206 may be configured to generate a signal indicative of a current temperature of the hydraulic brake 202. In one embodiment, as shown in the accompanied figures, the controller 208 may be communicatively coupled to the braking sensor 204 and the first temperature sensor 206.

It should be understood that if the temperature of the hydraulic brake 202 exceeds a certain failure temperature, the hydraulic brake 202 may fail. This failure of the hydraulic brake 202 may include physical breakage of components of the hydraulic brake 202, or a reduction in an amount of resistive force that the hydraulic brake 202 is capable of producing. The failure temperature can be pre-determined and a pre-determined allowable maximum temperature can therefore be calculated. The pre-determined allowable maximum temperature may generally include a safety factor and can therefore be lesser than the pre-determine failure temperature of the hydraulic brake 202.

When the current temperature of the hydraulic brake 202 rises above the pre-determined allowable maximum temperature, the hydraulic brake 202 is said to overheat. In one embodiment, the controller 208 may be configured to determine the rate of heat accumulation within the hydraulic brake 202, based on the current temperature of the hydraulic brake 202, the pre-determined allowable maximum temperature, and the brake command.

The rate of heat accumulation within the hydraulic brake 202 may be indicative of a rate at which heat is added to the hydraulic brake 202. Moreover, it should be noted that the current temperature of the hydraulic brake 202 is indicative of the temperature of the hydraulic brake 202 at a particular instant of time. However, the rate of heat accumulation may depict the change in temperature of the hydraulic brake 202 over a certain interval of time.

It should be understood that since some heat is stored within the hydraulic brake 202, the change in temperature over time within the hydraulic brake 202 is not instantaneous. Rather, the temperature may build slowly or quickly depending on the rate at which heat is added or dissipated into the environment. The rate of heat accumulation within the hydraulic brake 202 may vary depending on a number of factors such as, but not limited to, the amount of resistive torque produced by the hydraulic brake 202, the current temperature of the hydraulic brake 202, the current environmental temperature, and the like.

Moreover in case of the electric drive machine, different braking zones may be defined based on the degree of engagement of the brake pedal, for example, a retard-only zone, a continuous zone, an intermittent zone, and the like. In one embodiment, the rate of increase in temperature within the hydraulic brake 202 may be based on the braking zone. For example, when the braking operation remains in the continuous zone, the rate of heat accumulation may be relatively negligible when compared to the braking operation reaches the intermittent zone. It should be understood that the rate of heat accumulation within the hydraulic brake 202 across the braking zone may vary non-linearly based on the degree to which the hydraulic brake 202 is applied, current temperature of the hydraulic brake 202, and the like.

Referring to FIG. 2, the controller 208 may be communicably coupled to the display 210. The display 210 may include an indicator light, a display gauge, a monitor, or any combination thereof, to alpha-numerically, graphically or otherwise visually and/or audibly notify the operator of information. Further, based on the rate of heat accumulation within the hydraulic brake 202 determined by the controller 208, visual feedback may be provided to the operator via the display 210. In one embodiment, the display 210 may include at least a first display and a second display as will be explained with reference to the remaining figures.

The first display may provide visual feedback to the operator to indicate the rate of heat accumulation within the hydraulic brake 202 in a variety of ways. For example, in case of the electric drive machine, the first display may include one or more zones corresponding to the different braking zones, such as, the retard-only zone, the continuous zone, the intermittent zone, and the like. The first display may be indicative of the build-up of heat within the hydraulic brake 202 in the currently activated zone.

Further, the second display may indicate the current temperature of the hydraulic brake 202. The second display may include, for example, a dial, a temperature gauge, an alpha-numeric display panel, and the like. Based on a combined feedback provided by the first and second displays, the operator can be made aware of how much heat is being added to the hydraulic brake 202 and/or when an overheat condition of the hydraulic brake 202 may be reached. Accordingly, based on the combined feedback, the operator may be able to better utilize the hydraulic brake 202. Better utilization of the hydraulic brake 202 may allow the operator to drive the machine 100 at an optimum speed at which control over the machine 100 is maintained and overheating of the hydraulic brake 202 is avoided.

In another embodiment, the display 210 may also include a third display to indicate an approximation of time remaining prior to overheating of the hydraulic brake 202. The approximation of time remaining prior to overheating of the hydraulic brake 202 may allow the operator to ascertain how much time is left before the fluid in the hydraulic brake 202 increases in heat beyond the allowable maximum temperature. Also, the display 210 may include a fourth display for providing a warning indicative of an overheat condition of the hydraulic brake 202. The warning may be provided by means of any suitable visual or auditory feedback. This warning may indicate to the operator that the hydraulic brake 202 will reach the overheat condition very soon.

In another embodiment, the display 210 may also indicate a maximum allowable speed of the machine 100. The maximum allowable speed of the machine 100 may be indicative of the speed at which the machine 100 needs to be driven in order to reach the destination without causing the hydraulic brake 202 to overheat and thereby increasing machine productivity. Also, the display 210 may indicate a maximum braking force that can be applied by the operator without causing the hydraulic brake 202 to overheat. Various exemplary displays will be explained in connection with FIGS. 3-6.

Since the weight of the load carried by the machine 100 may change for each cycle, it may be difficult to predict a fixed speed of the machine 100 for avoiding overheating the hydraulic brake 202. Hence, in one embodiment, the controller 208 may include a mapping module 209 configured to record a travel history of the machine 100. The mapping module 209 may either be intrinsic or extrinsic to the controller 208. The mapping module 209 may be coupled to other sensors, such as, for example, a tire pressure sensor, a second temperature sensor, an inclinometer, and the like.

In one embodiment, the tire pressure sensor may generate a signal indicative of a current pressure of the wheels 112 of the machine 100 based on the weight of the load being carried by the machine 100. Further, the second temperature sensor may be configured to generate a signal indicative of an ambient temperature. The inclinometer may generate a signal indicative of a degree of inclination of the machine 100. The mapping module 209 may receive and monitor one or more signals received from any of the above-mentioned sensors.

In another embodiment, the controller 208 and/or the mapping module 209 may be coupled to a database or data storage and retrieval structure. The database may be intrinsic or extrinsic to the controller 208 and/or the mapping module 209. The database may be configured to store travel history of the machine 100 based on the received one or more signals, such as, e.g., during load and unload cycles of the machine 100. In another embodiment, the controller 208 and/or the mapping module 209 may be configured to retrieve and to plot as a map the one or more received signals. A person of ordinary skill in the art will appreciate that the monitored one or signals may provide a predictive analysis of overheating of the hydraulic brake 202 over time based on load carried by the machine 100, position of the machine 100, and the like.

Further, in one embodiment, the controller 208 may adjust a braking response of the machine 100 based on the mapped travel history. For example, the controller 208 may adjust the braking response by issuing control signals to the hydraulic brake 202, and modulating the braking force. In another example, the controller 208 may determine the maximum allowable speed of the machine 100 based on the travel history recorded by the mapping module 209. A person of ordinary skill in the art will appreciate that other sensors not mentioned herein may also be utilized to determine and plot as a map the travel history of the machine 100.

Figure 3:
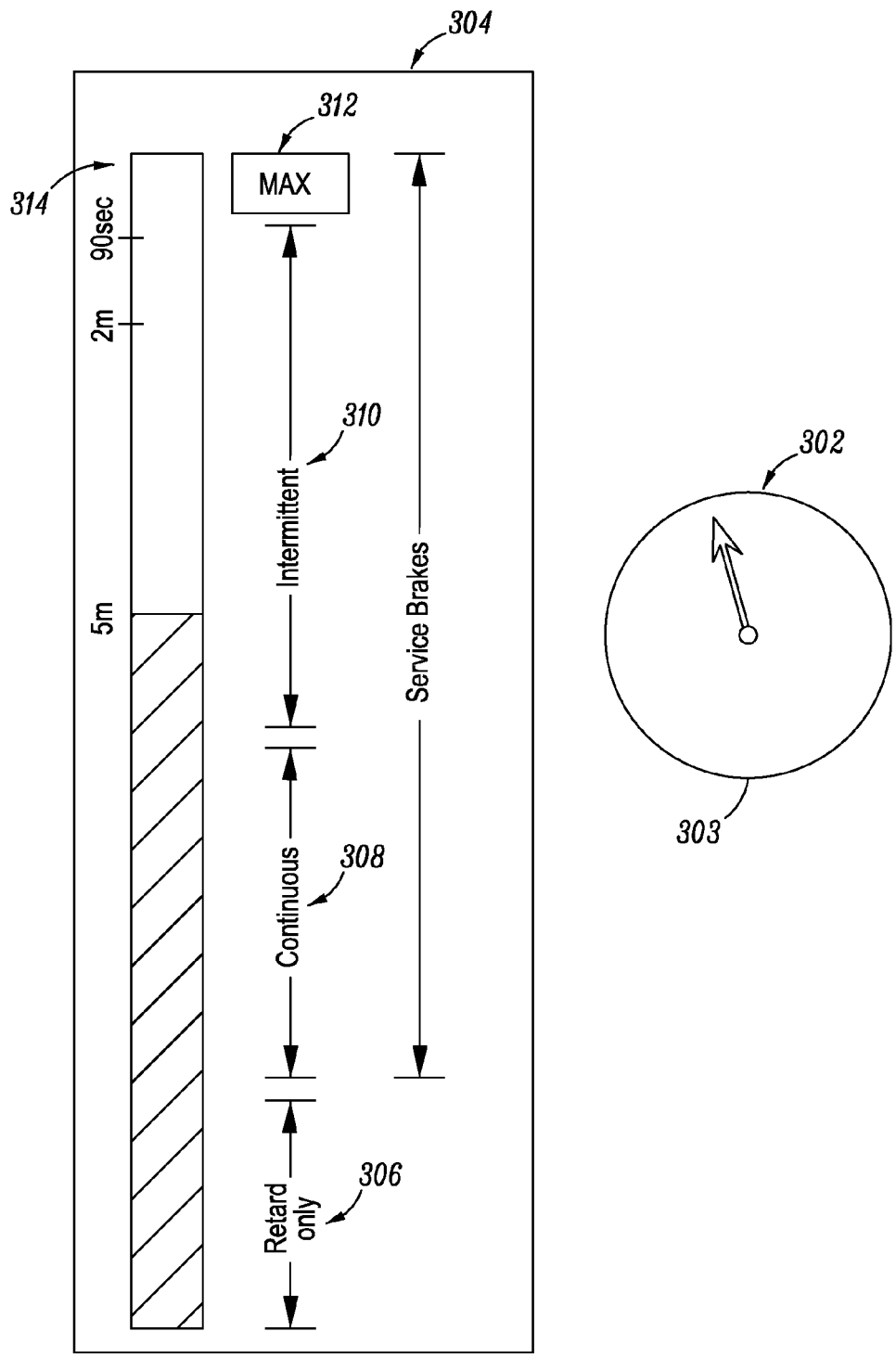
FIG. 3 is one exemplary display for visual feedback provided by a controller.

FIG. 3 depicts one exemplary visual feedback provided to the operator of the electric drive machine. As shown in FIG. 3, a second display 302 can include a braking temperature gauge 303 to indicate the current temperature of the hydraulic brake 202. The first display 304 may provide an indication of the rate of heat accumulation within the hydraulic brake 202.

In one embodiment, the first display 304 may include one or more zones. In this case, the one or more zones of the first display 304 may correspond to the retard-only zone 306, the continuous zone 308, the intermittent zone 310, and the maximum ('max') zone 312 respectively. The retard-only zone 306 is associated with the activation of the retarding system 201. On the other hand, the continuous and intermittent zone 308, 310 are associated with the activation of the hydraulic brake 202. The 'max' zone 312 is indicative of a maximum braking force applied when the operator engages the brake pedal to the maximum extent possible. It should be noted that other zones may also be included to indicate various combinations of braking operations.

The rate of heat accumulation may be associated with the activation of the hydraulic brake 202, and may be independent of the braking activated by the retarding system 201. For example, in case the braking is occurring in the retard-only zone 306, then the hydraulic brake 202 is inactive and hence the time remaining prior to overheating of the hydraulic brake 202 may be infinite in this case.

In one embodiment, a third display 314 indicative of the approximation of time remaining prior to overheating of the hydraulic brake 202 may be provided. As can be seen in FIG. 3, a first time period, such as, e.g., 5 minutes, is remaining prior to the overheating of the hydraulic brake 202 of the machine 100. Other time periods may be included. Also, in this case, the first display 304 indicates that the hydraulic brake 202 is currently in the intermittent zone 308. Based on the feedback provided by the display 210, the operator may be notified that the current temperature of the hydraulic brake 202 is within a suitable range. Also, the operator may be notified that the hydraulic brake 202 is activated and that based on the rate at which heat is being added within the hydraulic brake 202, about 5 minutes is remaining prior to the hydraulic brake reaching the overheat condition. Accordingly, the operator may manually alter the braking force applied in a suitable manner in order to allow the machine 100 to reach the destination without overheating the hydraulic brake 202.

Figure 4A:
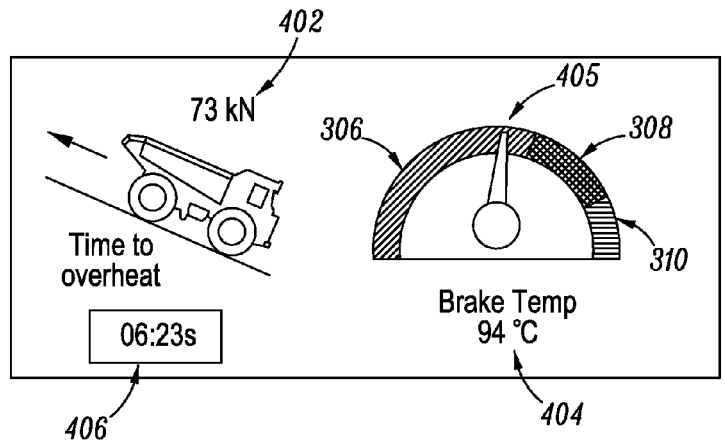
FIGS. 4A, 4B, 4C is a set of exemplary displays.
Figure 4B:
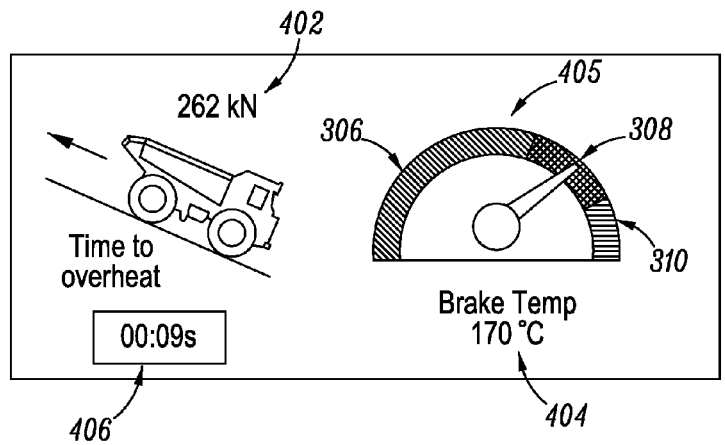
Figure 4C:
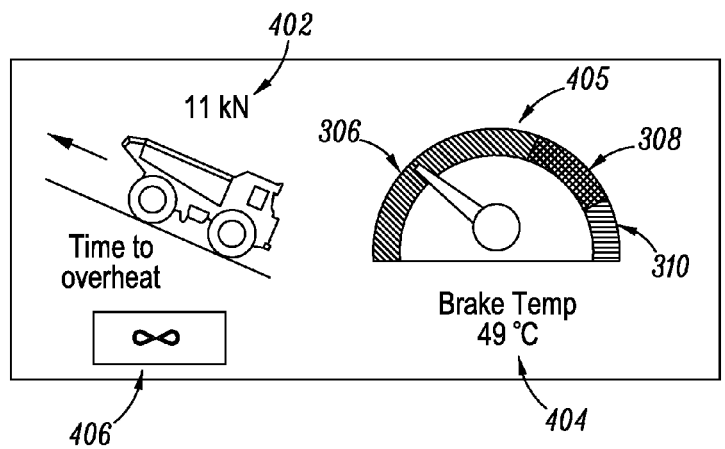

FIGS. 4A, 4B, 4C depict another set of exemplary displays at different instants of time. Three zones on a dial can be indicative of the retard-only zone 306, the continuous zone 308, and the intermittent zone 310, respectively. Less or more zones may be displayed. Referring to FIG. 4A, the operator is notified by a braking force display 402 of the braking force currently being applied, such as about 73 kN as shown. In one embodiment, one example of the second display may include a temperature display 404. In this case, the temperature display 404 indicates to the operator of the current temperature of the hydraulic brake 202, such as, e.g., about 94° C. as shown.

The visual feedback provided to the operator may indicate that the braking is currently occurring in one of the zones, such as, e.g., the retard-only zone 306. Based on the rate of heat accumulation within the hydraulic brake 202 determined by the controller 208, the operator may be notified of the time remaining prior to overheating of the hydraulic brake 202 at a time display 406. In this case, the operator is notified that about a period of 6 minutes and 23 seconds is remaining prior to overheating of the hydraulic brake 202.

FIG. 4B depicts the display provided to the operator at another instant of time. In this exemplary case, the operator is notified by the braking force display 402 that the braking force being applied is about 262 kN. The current temperature of the hydraulic brake 202 is shown to be about 170° C., as indicated at the temperature display 404. The current braking operation is shown in the continuous zone 308. Also, the operator is notified by the time display 406 that the time remaining prior to overheating of the hydraulic brake 202 is about 9 seconds. In yet another exemplary case depicted in FIG. 4C, the operator is notified that the current temperature of the hydraulic brake 202 is about 49° C. by the temperature display 404, and that the braking force is about 11 kN by the braking force display 402. As shown in the visual feedback, infinite time is remaining prior to overheating of the hydraulic brake 202, as indicated by the time display 406.

Figure 5A:
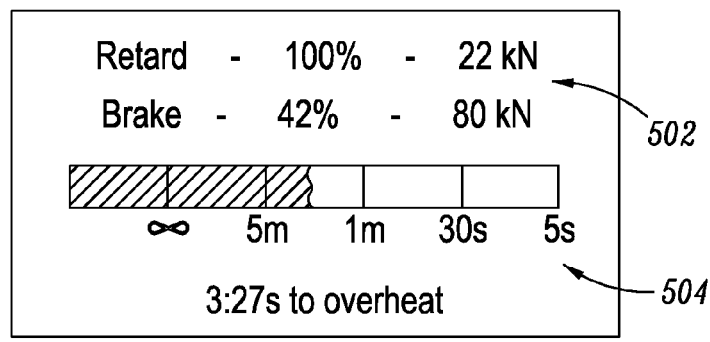
FIGS. 5A, 5B, 5C is another set of exemplary displays.
Figure 5B:
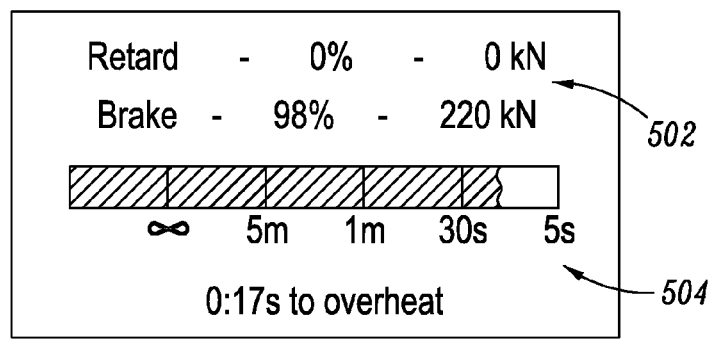
Figure 5C:
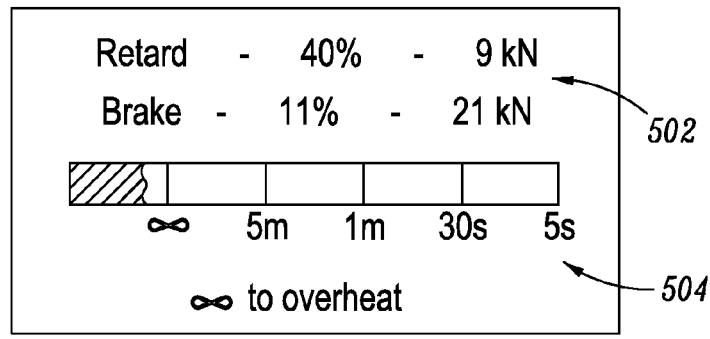

The exemplary visual feedbacks shown in FIGS. 5A, 5B, 5C notify the operator of the degree of activation of the hydraulic brake 202 of the machine 100 by a brake activation display 502, and the time remaining prior to overheating of the hydraulic brake 202 by a time display 504. In FIG. 5A, the operator is notified at the brake activation display 502 that the braking force is about 80 kN. Also, a period of about 3 minutes and 27 seconds is remaining prior to the overheating of the hydraulic brake 202, as indicated at the time display 504.

In FIG. 5B, the braking force is about 220 kN, as indicated at the brake activation display 502. Also, the operator is notified that about 17 seconds is remaining prior to the overheating of the hydraulic brake 202, as indicated at the time display 504. FIG. 5C depicts that infinite time is remaining prior to overheating of the hydraulic brake 202, as indicated at the time display 502. This can be due to the low hydraulic braking force of about 21 kN, as indicated at the brake activation display 502.

Figure 6A:
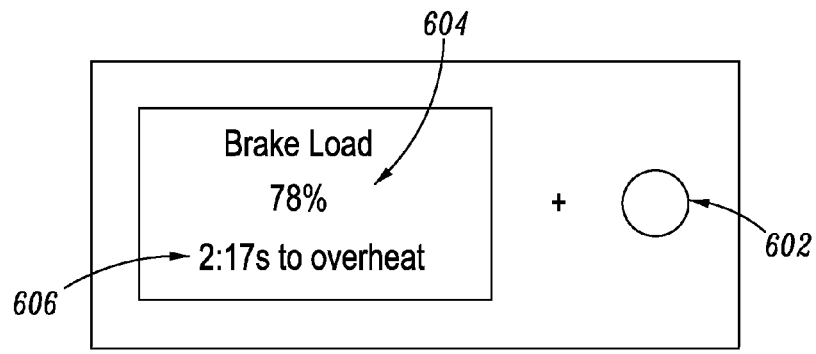
FIGS. 6A, 6B, 6C is yet another set of exemplary displays.
Figure 6B:
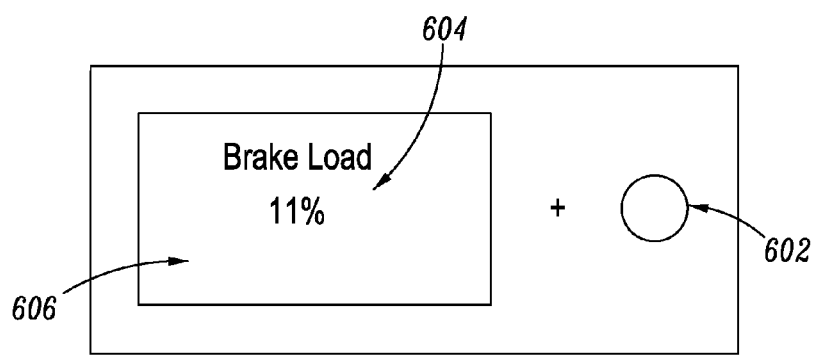
Figure 6C:
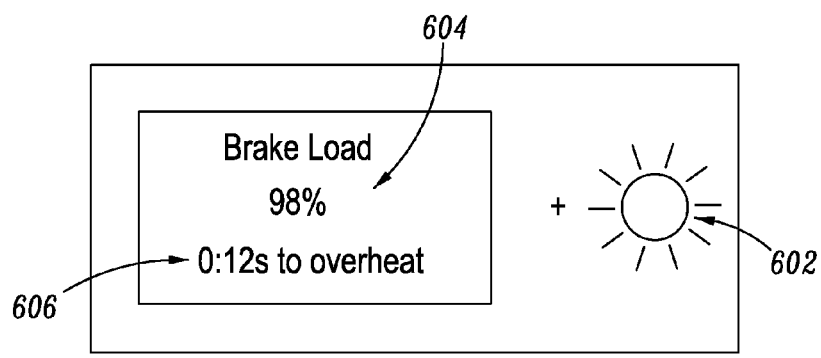

FIGS. 6A, 6B, 6C depict yet another exemplary set of visual feedback provided to the operator. In this case, the fourth display including a warning light 602 is provided. In FIG. 6A, the operator is notified by a brake display 604 that a current braking load of the hydraulic brake is about 78%. The operator is also notified that a period of about 2 minutes and 17 seconds is remaining prior to overheating of the hydraulic brake, as indicated at a time display 606. In FIG. 6B, due to the low braking load of about 11%, as indicated at the braking display 604, an infinite time is remaining prior to overheating of the hydraulic brake 202. Hence, the warning light 602 is deactivated. However, in FIG. 6C, only about 12 seconds is remaining prior to the overheating of the hydraulic brake 202, as indicated at the time display 606 and hence the warning light 602 is activated in order to alert the operator.

The visual feedbacks described herein are merely examples and do not limit the scope of this disclosure. It should be noted that the values shown on the displays are exemplary. Also, other such similar visual and/or auditory feedback to notify the operator of the rate of heat accumulation within the hydraulic brake 202 and/or time remaining prior to overheating of the hydraulic brake 202 may be utilized without deviating from the scope of this disclosure.

The controller 208 may embody a single microprocessor or multiple microprocessors that include a receiver for receiving signals from the one or more sensors and providing output to the display 210. Numerous commercially available microprocessors may be configured to perform the functions of the controller 208. It should be appreciated that the controller 208 may readily embody a general machine microprocessor capable of controlling numerous machine functions. The controller 208 may include memory and may access the memory in order to retrieve stored data. Moreover, the controller 208 may be capable of performing mathematical operations required for the computation of the rate of heat accumulation within the hydraulic brake 202, time remaining prior to overheating of the hydraulic brake 202 and/or maximum allowable speed of the machine 100, as well as other machine data.

A method 700 for notifying the operator of the rate of heat accumulation within the hydraulic brake 202 of the machine 100 will be explained in connection with FIG. 7.

INDUSTRIAL APPLICABILITY

Overheating of the hydraulic brake 202 during downhill travel of the machine 100 may cause the hydraulic brake 202 to become markedly ineffective. As a result, the operator is signaled to pull over the machine 100 so that the hydraulic brake 202 can cool down. There is an increased risk for time wasted while waiting for the hydraulic brake 202 to cool down, thereby causing a loss of machine productivity.

A theoretical best case for carrying a large load down a decline is to operate the machine 100 at as high of a speed as possible without overheating the hydraulic brake 202 at any time during the downhill cycle. In the case of a steep grade, the machine 100 should be operated such that the pre-determined allowable maximum temperature of the hydraulic brake 202 is reached just as the machine 100 reaches the base or bottom of the decline.

On reaching the bottom of the decline the hydraulic brake 202 may no longer be needed to control speed of the machine 100. This method of operation may produce a relatively low cost/ton to a customer. However factors like grade of a downward cycle, length of a downward slope, environmental temperature, load carried by the machine 100, may vary. Therefore, the desired speed at which the machine 100 may be safely operated can vary widely from site to site, from day to day, and from one load to the next.

Based on the feedback of the currently used displays, the operator may determine if the current temperature of the hydraulic brake 202 lies outside of a determined safe range. Further, with the feedback provided by the currently used braking displays, the operator may be unable to judge the speed at which machine 100 needs to be driven in order to reach the destination without overheating the hydraulic brake 202. Also, the operator may be unaware of the time remaining prior to overheating of the hydraulic brake 202, since the rate of heat accumulation within the hydraulic brake 202 may be unknown. Hence, in order to avoid reaching the overheat condition of the hydraulic brake 202, the operator may run the machine 100 at a much slower speed than the machine 100 can withstand, causing an increased cycle time and affecting the overall productivity.

The present disclosure, as described above, can directly provide feedback of the rate of heat accumulation within the hydraulic brake 202 which can be beneficial to the operator of the machine 100. The visual feedback provided to the operator by the display 210 may allow the operator to better utilize the hydraulic brake 202 based on the rate of heat accumulation within the hydraulic brake 202. This may allow the operator to judge the maximum allowable speed for running the machine 100 so that the destination can be reached without overheating the hydraulic brake 202. This in turn will decrease cycle time of the machine 100 and therefore increase productivity (tons/hr) and decrease operating costs (cost/ton).

Figure 7:
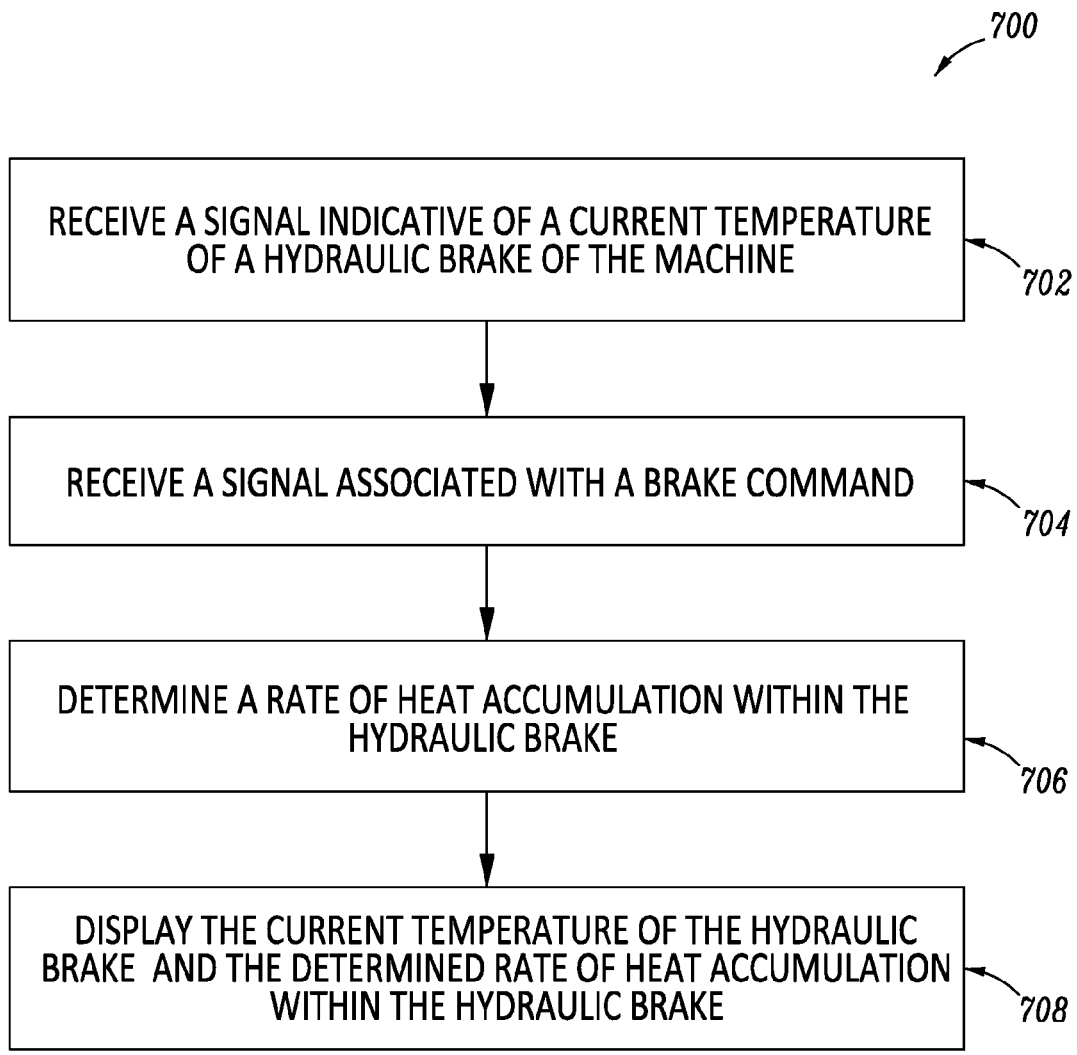
FIG. 7 is a process for notifying an operator of a rate of heat accumulation within a hydraulic brake in a machine.

FIG. 7 illustrates the method 700 for notifying the operator of the rate of heat accumulation within the hydraulic brake 202 in the machine 100. At step 702, the signal indicative of the current temperature of the hydraulic brake 202 may be received by the controller 208. The signal associated with the brake command may be received from the braking sensor 204 at step 704. Subsequently, at step 706, the controller 208 may determine the rate of heat accumulation within the hydraulic brake 202 based on the received signals and the pre-determined allowable maximum temperature of the hydraulic brake 202.

For example, the controller 208 may determine the rate of heat accumulation within the hydraulic brake 202 based on the change in the temperature of the hydraulic brake 202 over a fixed period of time, by computing a difference in temperature readings of the hydraulic brake 202. In another example, the determined rate of heat accumulation within the hydraulic brake 202 may also be based on a pre-determined increase in temperature associated with the braking zone. Moreover, in another embodiment, the controller 208 may compute the approximate time remaining prior to overheating of the hydraulic brake 202 based on the rate of heat accumulation within the hydraulic brake 202 and the time it will take to reach to the allowable maximum temperature of the hydraulic brake 202 if heat is added to the hydraulic brake 202 at the determined rate.

At step 708, the current temperature of the hydraulic brake 202 and the determined rate of heat accumulation within the hydraulic brake 202 may be displayed. As described above, the display 210 coupled to the controller 208 may provide the notification to the operator. In one embodiment, the display 210 may indicate the time remaining prior to overheating of the hydraulic brake 202. Also, the display 210 may indicate the maximum allowable speed at which the machine 100 needs to be driven to reach the destination without causing the hydraulic brake 202 to overheat. The determination of the maximum allowable speed of machine 100 may be based on the rate of heat accumulation within the hydraulic brake 202. Exemplary visual feedbacks are shown in FIGS. 3-6.

In one embodiment, the mapping module 209 may receive one or more signals from at least one of a tire pressure sensor, a second temperature sensor and an inclinometer. The mapping module 209 may monitor the one or more received signals. Moreover, the mapping module 209 may be configured to map the travel history of the machine 100 based on the monitored one or more signals. In another embodiment, the controller 208 may adjust the braking response of the machine 100 based on the mapped travel history of the machine 100.

A person of ordinary skill in the art will appreciate that based on the feedback provided by the display 210 the operator is made aware of the current temperature of the hydraulic brake 202 and also the rate of heat accumulation within the hydraulic brake 202. Hence, the operator may accordingly determine whether or not to apply the braking force such that slightly prior to overheating of the hydraulic brake 202, the machine 100 completes its descent or reaches the bottom of the hill. In one embodiment, the mapping module 209 may map the travel history of the machine 100 on a regular basis, such as a daily basis. In another embodiment, based on the mapped travel history, the controller 208 may begin to predict where the machine 100 is, and modulate the speed and/or braking accordingly to allow the machine 100 to reach the destination without overheating the hydraulic brake 202.

It should be noted that the disclosure may be utilized on the mechanical drive machines and/or the electric drive machines. More specifically, the disclosure may be utilized in relatively large construction machines which are capable of moving rapidly downhill. For example, the display 210 may be used in the large mining truck 102 that is capable of carrying loads of up to about 400 tons. It will apparent to one of ordinary skill in the art that the visual feedback provided to the operator by the controller 208 may be most beneficial in this case. In one embodiment, the display 210 may also be utilized on other machines such as, for example, quarry and other similar construction trucks that are capable of carrying loads of up to about 100 tons, and also on machines like the articulated truck which can carry loads of up to about 40 tons.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A display for a machine having a hydraulic brake, the display comprising:
    a first display to indicate a rate of heat accumulation within the hydraulic brake; and
    a second display to indicate a current temperature of the hydraulic brake.

2. The display of claim 1, wherein the machine further includes an electric motor configured to provide partial braking.

3. The display of claim 1, wherein the first display further includes one or more zones.

4. The display of claim 1 further including a third display to indicate an approximation of time remaining prior to overheating of the hydraulic brake.

5. The display of claim 1 further including a fourth display to indicate a warning of overheating of the hydraulic brake.

6. The display of claim 1, wherein the display is coupled to a controller, the controller configured to determine the rate of heat accumulation within the hydraulic brake based, at least in part, on the current temperature of the hydraulic brake, a pre-determined allowable maximum temperature, and a brake command.

7. The display of claim 6, wherein the controller further includes a mapping module configured to map travel history of the machine.

8. The display of claim 1, wherein the display includes at least one of an indicator light, a display gauge, and a monitor.

9. A method comprising:
    receiving a signal indicative of a current temperature of a hydraulic brake of the machine;
    receiving a signal associated with a brake command;
    determining a rate of heat accumulation within the hydraulic brake based, at least in part, on the received signals and a pre-determined allowable maximum temperature; and
    displaying the current temperature of the hydraulic brake and the determined rate of heat accumulation within the hydraulic brake.

10. The method of claim 9 further including displaying one or more zones of rate of heat accumulation.

11. The method of claim 9 further including displaying an approximation of time remaining prior to overheating of the hydraulic brake.

12. The method of claim 9 further including displaying a warning of overheating of the hydraulic brake.

13. The method of claim 9 further including mapping travel history of the machine.

14. A machine comprising:
    a hydraulic brake to retard the machine;
    a braking sensor associated with the hydraulic brake, the braking sensor adapted to generate a signal indicative of a brake command;

a first temperature sensor coupled to the hydraulic brake, the first temperature sensor configured to generate a signal indicative of a current temperature of the hydraulic brake;

a controller in communication with the first temperature sensor and the braking sensor, the controller configured to determine a rate of heat accumulation within the hydraulic brake based, at least in part, on the current temperature of the hydraulic brake, a pre-determined allowable maximum temperature, and the brake command; and a display coupled to the controller, the display including:
 a first display to indicate a rate of heat accumulation within the hydraulic brake; and
 a second display to indicate a current temperature of the hydraulic brake.

15. The machine of claim 14 further including an electric motor configured to provide partial braking.

16. The machine of claim 14, wherein the first display further includes one or more zones.

17. The machine of claim 14 further including a third display to indicate an approximation of time remaining prior to overheating of the hydraulic brake.

18. The machine of claim 14 further including a fourth display to indicate a warning of overheating of the hydraulic brake.

19. The machine of claim 14, wherein the controller further includes a mapping module configured to map travel history of the machine.

20. The machine of claim 14, wherein the display includes at least one of an indicator light, a display gauge, and a monitor.

\* \* \* \* \*